United States Patent
Buddha et al.

(10) Patent No.: US 9,819,980 B2
(45) Date of Patent: Nov. 14, 2017

(54) METHOD AND SYSTEM FOR ASSESSING VIEWING QUALITY OF MEDIA OBJECTS

(71) Applicant: Videology, Inc., Baltimore, MD (US)

(72) Inventors: Sreenivas Buddha, Cockeysville, MD (US); Matthew Grierson, New York, NY (US)

(73) Assignee: VIDEOLOGY, INC., Baltimore, MD (US)

( * ) Notice: Subject to any disclaimer, the term of this patent is extended or adjusted under 35 U.S.C. 154(b) by 0 days.

(21) Appl. No.: 15/062,869

(22) Filed: Mar. 7, 2016

(65) Prior Publication Data
US 2016/0191968 A1    Jun. 30, 2016

Related U.S. Application Data

(62) Division of application No. 14/586,015, filed on Dec. 30, 2014, now Pat. No. 9,525,898.

(51) Int. Cl.
| | |
|---|---|
| *H04N 21/24* | (2011.01) |
| *H04N 21/2547* | (2011.01) |
| *H04N 21/81* | (2011.01) |
| *H04N 21/647* | (2011.01) |
| *H04N 21/234* | (2011.01) |
| *H04N 21/442* | (2011.01) |
| *H04N 21/4425* | (2011.01) |

(52) U.S. Cl.
CPC ... *H04N 21/2407* (2013.01); *H04N 21/23418* (2013.01); *H04N 21/2547* (2013.01); *H04N 21/4425* (2013.01); *H04N 21/44209* (2013.01); *H04N 21/64738* (2013.01); *H04N 21/812* (2013.01)

(58) Field of Classification Search
CPC ....... H04N 21/44222; H04N 21/23418; H04N 21/64738
See application file for complete search history.

(56) References Cited

U.S. PATENT DOCUMENTS

| | | | |
|---|---|---|---|
| 8,561,104 B1 | 10/2013 | Dow et al. | |
| 9,202,267 B1* | 12/2015 | Yang | G06T 5/002 |
| 2012/0281142 A1* | 11/2012 | Pettersson | H04N 17/004 |
| | | | 348/553 |
| 2013/0057705 A1* | 3/2013 | Parker | H04N 17/004 |
| | | | 348/184 |
| 2013/0066719 A1 | 3/2013 | Kast et al. | |

(Continued)

OTHER PUBLICATIONS

Office Action dated Jun. 29, 2016 in U.S. Appl. No. 15/062,535.
(Continued)

*Primary Examiner* — Olugbenga Idowu
(74) *Attorney, Agent, or Firm* — Pillsbury Winthrop Shaw Pittman LLP

(57) ABSTRACT

Method, system, and programs for assessing viewing quality of media objects (e.g., advertisements) are provided. In one example, information regarding one or more delivery conditions of an advertisement that is served at a user device is received. Viewing quality of the advertisement is estimated based on the one or more delivery conditions. Information regarding one or more advertising pricing parameters related to the advertisement is received. The viewing quality of the advertisement and the one or more advertising pricing parameters are provided.

20 Claims, 17 Drawing Sheets

(56) References Cited

U.S. PATENT DOCUMENTS

| | | |
|---|---|---|
| 2013/0238417 A1 | 9/2013 | Frelk |
| 2013/0268954 A1* | 10/2013 | Hulten ................. H04N 21/442 |
| | | 725/12 |
| 2014/0044348 A1 | 2/2014 | Chen |
| 2014/0149210 A1 | 5/2014 | Ma et al. |
| 2014/0331247 A1 | 11/2014 | Mick, Jr. et al. |
| 2015/0113385 A1* | 4/2015 | Schumacher ..... G06F 17/30905 |
| | | 715/240 |
| 2015/0254806 A1 | 9/2015 | Circlaeys |

OTHER PUBLICATIONS

Office Action dated Apr. 8, 2016 in U.S. Appl. No. 14/586,015.
International Search Report and Written Opinion dated Mar. 11, 2016 in International Application No. PCT/US2015/067826.
Office Action dated Jan. 9, 2017 in U.S. Appl. No. 15/062,462.

* cited by examiner

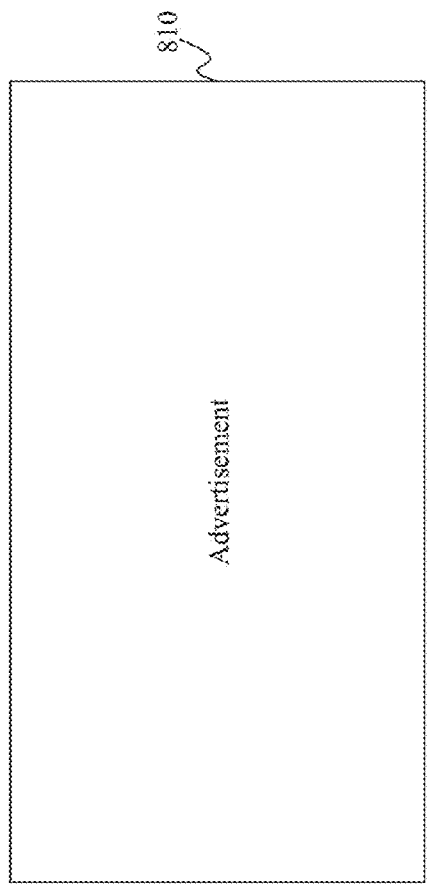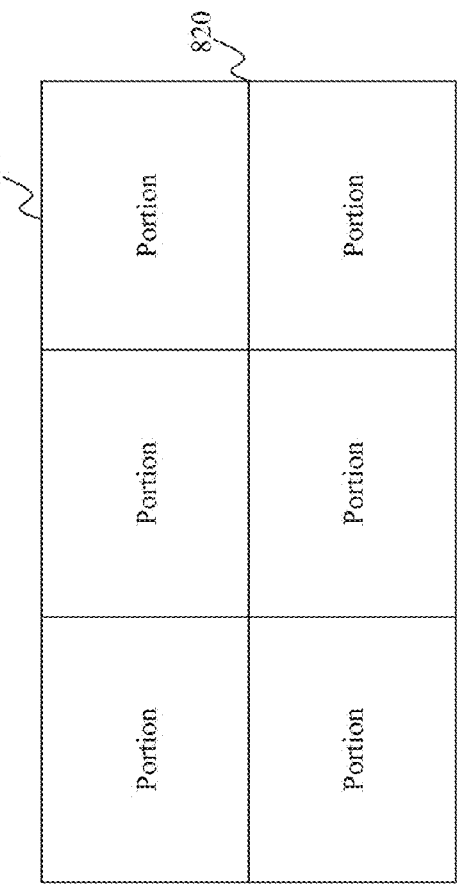

METHOD AND SYSTEM FOR ASSESSING VIEWING QUALITY OF MEDIA OBJECTS

CROSS REFERENCE TO RELATED APPLICATION

This application is a division of U.S. application Ser. No. 14/586,015 filed Dec. 30, 2014, which is incorporated herein by reference in its entirety.

BACKGROUND

1. Technical Field

The present teaching relates to methods, systems, and programming for advertising. More particularly, the present teaching relates to methods, systems, and programming for assessing advertisement delivery quality.

2. Discussion of Technical Background

In recent years, the percentage of the consumer demographics on the Internet has experienced exponential growth, and continues to grow, thereby fueling the incentive for businesses to advertise online. Many advertising companies offer pay-per-impressions programs, which charge their customers (e.g., businesses) for each rendering of an advertisement. Per-per-impression programs, however, fail to consider whether an advertisement is actually viewable to a user when an advertisement has been considered delivered, such as whether the advertisement is in-view on a screen to the user. Similar problems exist for general media objects delivered to users for viewing, including videos, animations, images, audios, textual content, other types of media objects, or any combination thereof. While existing systems that assess viewing quality of advertisements alleviate some of the issues of pay-per-impression programs, such systems are nevertheless amendable to improvement. As an example, many existing systems that assess viewing quality of media objects will fail to mark an advertisement on a browser as viewable even when the advertisement is in-view if the browser is not the active application currently used by a user. These and other drawbacks exist.

SUMMARY

The teachings disclosed herein relate to methods, systems, and programming for assessing viewing quality of media objects (e.g., advertisements).

In one example, a method, implemented on at least one machine, each of which has at least one processor, storage, and a communication platform connected to a network for assessing viewing quality of media objects, is disclosed. Information regarding one or more delivery conditions of an advertisement that is served at a user device is received. Viewing quality of the advertisement is estimated based on the delivery conditions. Information regarding one or more advertising pricing parameters related to the advertisement is received. The viewing quality of the advertisement and the advertising pricing parameters are provided.

In another example, a method, implemented on at least one machine, each of which has at least one processor, storage, and a communication platform connected to a network for assessing viewing quality of media objects, is disclosed. Information regarding one or more frame rates of an advertisement that is served at a user device is received. Viewing quality of the advertisement is estimated based on the frame rates. The viewing quality of the advertisement is provided.

In another example, a method, implemented on at least one machine, each of which has at least one processor, storage, and a communication platform connected to a network for assessing viewing quality of media objects, is disclosed. Information regarding a state of each of one or more objects associated with a media object that is served at a user device is received. Viewing quality of the associated objects is estimated, based on the state of each of the associated objects, without receiving a frame rate of the associated objects. Viewing quality of the media object is estimated based on the viewing quality of the associated objects.

In another example, a method, implemented on at least one machine, each of which has at least one processor, storage, and a communication platform connected to a network for assessing viewing quality of media objects, is disclosed. Information indicating a throttle event with respect to each of one or more objects associated with a media object that is served at a user device is received. A parameter in connection with each of the associated objects is throttled by the respective throttle event. Viewing quality of the associated objects is estimated based on the throttle event with respect to each of the associated objects. Viewing quality of the media object is estimated based on the viewing quality of the associated objects.

In another example, a system for assessing viewing quality of media objects is disclosed. The system comprises a viewing quality assessment system. The viewing quality assessment system comprises a delivery condition evaluation unit, a viewing quality evaluation unit, and a billing and/or reporting evaluation unit. The delivery condition evaluation unit is configured to receive information regarding one or more delivery conditions of an advertisement that is served at a user device. The viewing quality evaluation unit is configured to estimate viewing quality of the advertisement based on the delivery conditions. The billing and/or reporting evaluation unit is configured to receive information regarding one or more advertising pricing parameters related to the advertisement, and provide the viewing quality of the advertisement and the advertising pricing parameters.

In another example, the delivery condition evaluation unit is configured to receive information regarding one or more frame rates of an advertisement that is served at a user device. The viewing quality evaluation unit is configured to estimate viewing quality of the advertisement based on the one or more frame rates. The billing and/or reporting evaluation unit is configured to provide the viewing quality of the advertisement.

In another example, the delivery condition evaluation unit is configured to receive information regarding a state of each of one or more objects associated with a media object that is served at a user device. The viewing quality evaluation unit is configured to estimate viewing quality of the associated objects based on the state of each of the associated objects without the system receiving a frame rate of the associated objects, and estimate viewing quality of the media object based on the viewing quality of the associated objects.

In another example, the delivery condition evaluation unit is configured to receive information indicating a throttle event with respect to each of one or more objects associated with a media object that is served at a user device. A parameter in connection with each of the associated objects is throttled by the respective throttle event. The viewing quality evaluation unit is configured to estimate viewing quality of the associated objects based on the throttle event with respect to each of the associated objects, and estimate viewing quality of the media object based on the viewing quality of the associated objects.

Other concepts relate to software for assessing viewing quality of media objects. A software product, in accord with this concept, includes at least one machine-readable, non-transitory medium and information carried by the medium. The information carried by the medium may be executable program code data regarding parameters in association with a request or operational parameters, such as information related to a user, a request, or a social group, etc.

In one example, a machine readable and non-transitory medium has information recorded thereon for accessing viewing quality of media objects, wherein the information, when read by the machine, causes the machine to perform a series of steps. Information regarding one or more delivery conditions of an advertisement that is served at a user device is received. Viewing quality of the advertisement is estimated based on the delivery conditions. Information regarding one or more advertising pricing parameters related to the advertisement is received. The viewing quality of the advertisement and the advertising pricing parameters are provided.

In another example, a machine-readable, non-transitory medium has information recorded thereon for accessing viewing quality of media objects, wherein the information, when read by the machine, causes the machine to perform a series of steps. Information regarding one or more frame rates of an advertisement that is served at a user device is received. Viewing quality of the advertisement is estimated based on the one or more frame rates. The viewing quality of the advertisement is provided.

In another example, a machine-readable, non-transitory medium has information recorded thereon for accessing viewing quality of media objects, wherein the information, when read by the machine, causes the machine to perform a series of steps. Information regarding a state of each of one or more objects associated with a media object that is served at a user device is received. Viewing quality of the associated objects is estimated, based on the state of each of the associated objects, without receiving a frame rate of the associated objects. Viewing quality of the media object is estimated based on the viewing quality of the associated objects.

In another example, a machine-readable, non-transitory medium has information recorded thereon for accessing viewing quality of media objects, wherein the information, when read by the machine, causes the machine to perform a series of steps. Information indicating a throttle event with respect to each of one or more objects associated with a media object that is served at a user device is received. A parameter in connection with each of the associated objects is throttled by the respective throttle event. Viewing quality of the associated objects is estimated based on the throttle event with respect to each of the associated objects. Viewing quality of the media object is estimated based on the viewing quality of the associated objects.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like-reference numerals represent similar structures throughout the several views of the drawings, and wherein:

FIGS. 8A and 8B illustrate exemplary presentations of advertisements, according to different embodiments of the present teaching;

DETAILED DESCRIPTION

Figure 1:
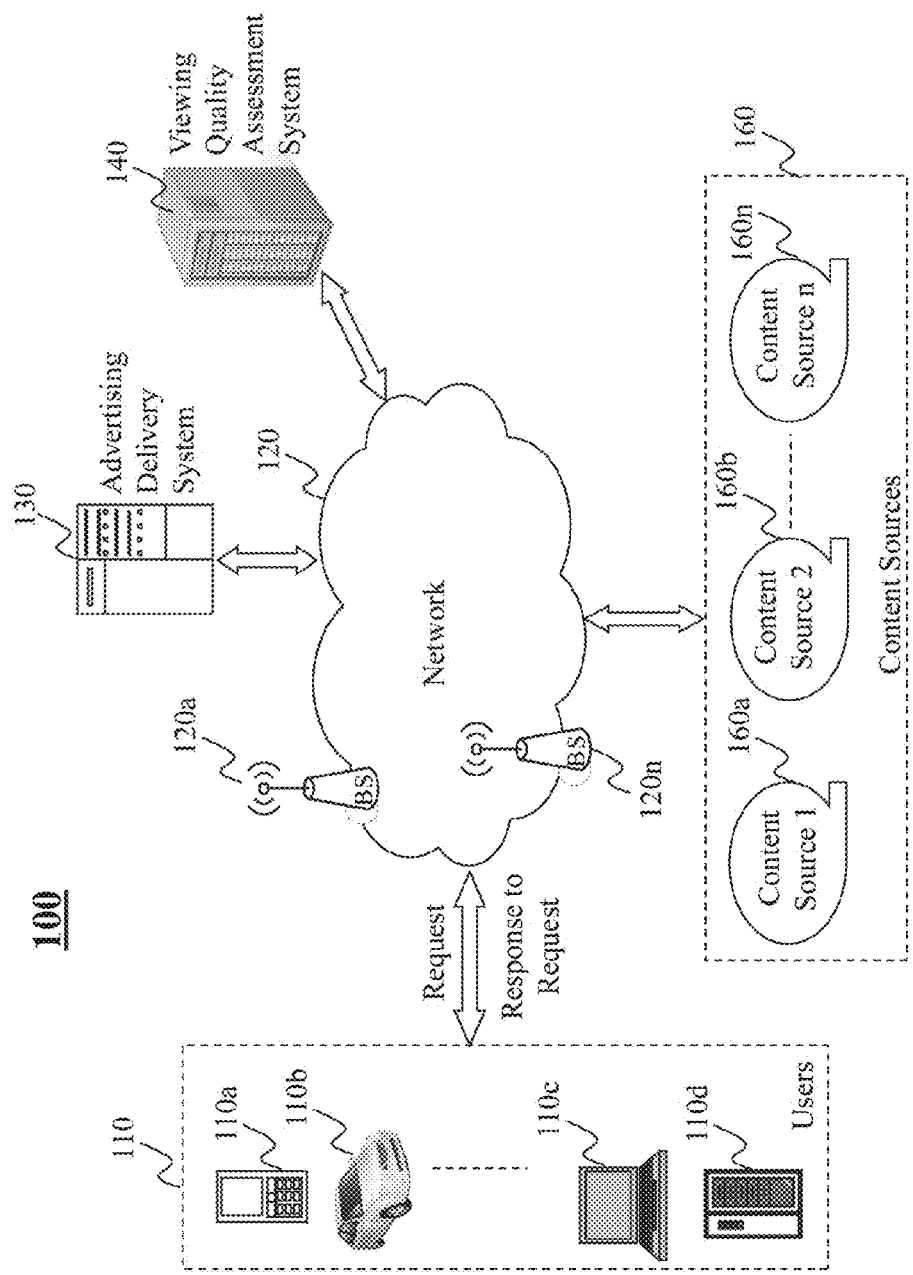
FIGS. 1-2 depict exemplary embodiments of a networked environment in which assessment of viewing quality of media objects is applied, according to different embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high level, without detail, in order to avoid unnecessarily obscuring aspects of the present teachings.

The present teaching relates to assessing viewing quality of media objects (e.g., advertisements, videos, animations, images, audios, or other media objects). In various embodiments, viewing quality of a media object (provided for presentation to a user) is estimated. In an embodiment, the viewing quality of the media object is provided for reporting to one or more business entities. As an example, the estimation is used to generate a report indicating the viewing quality of the media object and/or determine billing information related to delivery of the media object. The estimation may, for example, include determining whether and/or the extent to which the advertisement is viewable to the user.

In an embodiment, information regarding one or more delivery conditions of the media object is received. The delivery condition information is then processed to determine the delivery conditions of the media object, including conditions of a network (e.g., bandwidth, latency, etc.) over which the media object is delivered, a response time of the media object, a frame rate of the media object, a compression ratio of the media object, or other delivery condition (e.g., whether a parameter of the media object has been throttled or other conditions). In some embodiments, the delivery conditions correspond to one or more given times at which portions of the media object is rendered (e.g., a portion corresponding to a first time interval of the media object, a portion corresponding to a second time interval of the media object, etc.). Viewing quality of the media object is estimated based on the delivery conditions of the media object.

In an embodiment, the media object includes multiple portions where at least some of the media object portions have delivery conditions different from one another. Receipt of information regarding the delivery conditions of the media object includes receipt of information regarding a delivery condition of a first portion of the media object, receipt of information regarding a delivery condition of a second portion of the media object, and so on. In some embodiments, at least some of the media object portions have delivery conditions different from one another at a given time. As an example, the delivery condition information is processed to determine a frame rate of the first portion of the media object, a frame rate of the second portion of the media object, and so on. Viewing quality of the media object is estimated based on the frame rate of the first portion of the media object, the frame rate of the second portion of the media object, or frame rates of other portions of the media object. As another example, the delivery condition information is processed to determine other delivery conditions of the media object portions, and viewing quality of the media object is estimated based on the other delivery conditions of the media object portions.

In an embodiment, information regarding one or more objects associated with the media object is received. The associated objects may, for example, include supplemental objects for monitoring aspects of the media object. The associated object information is then processed to determine one or more states of the associated objects, one or more delivery conditions of the associated objects, or other information regarding the associated objects. A state of an associated object may, for example, include a throttled-down state identifying that the associated object (or a parameter thereof) is throttled down, a throttled-up state identifying that the associated object (or a parameter thereof) is throttled up, a non-throttled state identifying that the associated object (or a parameter thereof) is not throttled, or other state. A delivery condition of an associated object may include conditions of a network (e.g., bandwidth, latency, etc.) over which the associated object is delivered, a response time of the associated object, a frame rate of the associated object, a compression ratio of the associated object, or other delivery condition. Viewing quality of the media object is estimated based on the states of the associated objects, the delivery conditions of the associated objects, or other criteria. In some embodiments, viewing quality of the media object is estimated based on the states of the associated objects without receiving information identifying the delivery conditions (e.g., without knowing the frame rates of the associated objects, without knowing certain other delivery conditions of the associated objects, etc.).

As discussed, although systems that assess viewing quality of advertisements exist, many include "pure" Javascript systems that suffer from natural restrictions of Javascript. As an example, when an advertisement (or other media object) is placed within a frame (e.g., iframe) embedded on a webpage, Javascript code (or other client-side code) served with the advertisement may be unable to determine certain information generally used assess viewing quality of the advertisement (e.g., whether or the extent to which the advertisement is viewable). For example, the Javascript code may not be able to determine the dimensions of the web page (on which the frame is embedded), which portion of the webpage is within the browser viewport rendering the webpage, or other information generally used to assess viewing quality of the advertisement. As such, it is important not to rely solely on Javascript (or other client-code) served with advertisements to assess viewing quality.

FIG. 1 is a high level depiction of an exemplary system 100 in which a viewing quality assessment system 140 is deployed to assess viewing quality of media objects (e.g., advertisements), according to an embodiment of the present teaching. The exemplary system 100 includes users 110, a network 120, an advertising delivery system 130, a viewing quality assessment system 140, content sources 160, or other components. The network 120 in system 100 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 120a-120n, through which a data source may connect to the network in order to transmit information via the network.

Users 110 may be of different types such as users connected to the network via desktop connections (110d), users connecting to the network via wireless connections such as through a laptop (110c), a handheld device (110a), or a built-in device in a motor vehicle (110b). The advertising delivery system 130 may provide advertisements (or other content) for presentation to the users (e.g., on their user devices) via the network 120. The advertisements may be provided in the form of media objects (e.g., videos, animations, images, etc.) for presentation to the users. In some embodiments, the viewing quality assessment system 140 utilizes information received from the user devices to assess the viewing quality of media objects.

In an embodiment, a user device (or an application thereof) monitors one or more delivery conditions of a media object that is served at the user device. These monitored delivery conditions include a condition of a network over which the media object was delivered (e.g., bandwidth of the network, latency of the network, etc.), a response time of the media object (e.g., the amount of time between a request for the media object and presentation of the media object), a frame rate of the media object (e.g., a frame rate at which the media object is rendered), a compression ratio of the media object, or other delivery condition. Based on the monitoring, the user device transmits information regarding the delivery conditions of the media object to the viewing quality assessment system 140, which then processes the delivery condition information to estimate the viewing quality of the media object.

In an embodiment, upon receipt of information regarding one or more delivery conditions of a media object (e.g., from a user device at which the media object is served), the viewing quality assessment system 140 processes the delivery condition information to determine whether one or more condition thresholds have been satisfied, and estimates the viewing quality of the media object based on whether the condition thresholds have been satisfied. As an example, a delivery condition of the media object that satisfies a condition threshold may indicate whether (or the extent to which) the media object is viewable to a user (e.g., that the media object is "in-view," that the media object is "out-of-view," etc.). As another example, a delivery condition of the media object that does not satisfy a condition threshold may indicate whether (or the extent to which) the media object is viewable to a user (e.g., that the media object is "in-view," that the media object is "out-of-view," etc.).

In one use case, a media object (e.g., an advertisement) is delivered to a user device, which is then rendered on a browser (or other application) at the user device. The browser is programmed to throttle a frame rate of the media object when the media object (or a certain percentage thereof) is not within the browser viewport. As an example, although certain media objects (e.g., videos) are typically rendered on the browser at frame rates of 24, 25, 30, 48, 50, or 60 frames per second (fps) (e.g., when the media object is within the browser viewport), the browser throttles a media object to a frame rate of 1 fps when it detects that the media object is not within the browser viewport. The browser monitors and provides information regarding one or more delivery conditions of the media object, such as the current frame rate of the media object, to the viewing quality assessment system 140. The viewing quality assessment system 140, for example, then processes the frame rate of the media object to determine whether the frame rate is greater than a particular frame rate threshold (e.g., 1 fps or other frame rate less than common video frame rates).

If the frame rate is less than or equal to the frame rate threshold (e.g., which indicates that the browser throttled the media object), the viewing quality assessment system 140 determines that the media object (or a portion thereof) is currently not in within the browser viewport. Otherwise, the viewing quality assessment system 140 determines that the media object (or a portion thereof) is currently within the browser viewport. The determination of whether the media object (or a portion thereof) is within the browser viewport may be utilized by viewing assessment system 140 to determine whether (or the extent to which) the media object is viewable to a user. Other factors may, of course, be utilized to determine whether (or the extent to which) the media object is within the browser viewport, as well as whether (or the extent to which) the media object is viewable to a user.

In an embodiment, the viewing quality assessment system 140 need not necessarily receive information identifying the actual frame rate (or absolute values of other delivery conditions) of a media object that is served at a user device to estimate the viewing quality of the media object. As an example, in some embodiments, the viewing quality assessment system 140 utilizes information regarding one or more states of the media object to estimate the viewing quality of the media object. Upon receipt of the state information, for example, the viewing quality assessment system 140 processes the state information to determine whether the media object is in a state indicating that the media object is viewable to a user, and estimates the viewing quality of the media object based on whether the media object is in a state indicating that the media object is viewable to a user. The estimated viewing quality for the media object may, for instance, include "viewable to a user," "not viewable to a user," "an X percentage is viewable to a user," or other estimation.

In one scenario, a media object (e.g., an advertisement) is delivered to a user device, which is then rendered on a browser (or other application) at the user device. The browser is programmed to invoke a throttle-down event with respect to the media object when the media object (or a certain percentage thereof) is not within the browser viewport. When a throttle-down event is invoked for the media object, a frame rate of the media object (or other parameter thereof) is throttled down. As an example, although the media object is typically rendered on the browser at a frame rate of 24 fps (or other frame rate) (e.g., when the media object is within the browser viewport), the browser throttles down the frame rate of the media object to a frame rate of 1 fps when it detects that the media object is not within the browser viewport. Upon invoking the throttle-down event, the browser provides information indicating the throttle-down event (e.g., state information specifying that the throttle-down event was invoked for the media object) to the viewing quality assessment system 140. When the viewing quality assessment system 140 processes the indication of the throttle-down event, it determines that the media object (or a certain percentage thereof) is not currently within the browser viewport (and/or not viewable to a user). As such, by using such throttle event indications, the actual frame rate (or absolute values of other delivery conditions) of the media object need not necessarily be known by the viewing quality assessment system 140 for it to estimate the viewing quality of the media object.

In an embodiment, a user device (or an application thereof) monitors one or more delivery conditions of objects associated with a media object that is served at the user device. In some embodiments, the associated objects are rendered at the user device with the media object (e.g., behind the media object, in front of the media object, adjacent to the media object, proximate to the media object, etc.). Based on the monitoring, the user device transmits information regarding the delivery conditions of the associated objects to the viewing quality assessment system 140, which then processes the delivery condition information to estimate the viewing quality of the associated objects and/or the media object.

In an embodiment, upon receipt of information regarding delivery conditions of objects associated with a media object (e.g., from a user device at which the media object is served), the viewing quality assessment system 140 processes the delivery condition information to determine whether one or more delivery conditions of the associated objects satisfy one or more condition thresholds. The viewing quality assessment system 140 estimates, for each of the associated objects, the viewing quality of the associated object based on whether (or how many of) the delivery conditions of the associated object satisfies the condition thresholds. The estimated viewing quality for each associated object may, for instance, include "viewable to a user,"

"not viewable to a user," "an X percentage is viewable to a user," or other estimation. The viewing quality assessment system 140 then estimates the viewing quality of the media object based on the estimated viewing quality of the associated objects. As an example, if the number of the associated objects estimated to be viewable to a user is greater than the number of the associated objects estimated to not be viewable to a user, this indicates to the viewing quality assessment system 140 that the media object (or at least a sufficient portion thereof) is viewable to the user.

In an embodiment, a user device (or an application thereof) monitors one or more states of objects associated with a media object that is served at the user device. Based on the monitoring, the user device transmits information regarding the states of the associated objects to the viewing quality assessment system 140, which then processes the state information to estimate the viewing quality of the associated objects and/or the media object. In an embodiment, upon receipt of the state information, the viewing quality assessment system 140 processes the state information to determine, for each of the associated objects, whether the associated object is in a state indicating that the associated object is viewable to a user. The viewing quality assessment system 140 estimates, for each of the associated objects, the viewing quality of the associated object based on whether the associated object is in a state indicating that the associated object is viewable to a user. The estimated viewing quality for each associated object may, for instance, include "viewable to a user," "not viewable to a user," "an X percentage is viewable to a user," or other estimation. The viewing quality assessment system 140 then estimates the viewing quality of the media object based on the estimated viewing quality of the associated objects. As an example, if the number of the associated objects estimated to be viewable to a user is greater than the number of the associated objects estimated to not be viewable to a user, this indicates to the viewing quality assessment system 140 that the media object (or at least a sufficient portion thereof) is viewable to the user.

In one use case, a media object (e.g., an advertisement) is delivered to a user device, which is then rendered on a browser (or other application) at the user device. One or more objects associated with the media object is delivered to the user device and/or rendered on the browser at the user device. The browser is programmed to invoke, for each of the associated objects, a throttle-down event with respect to the associated object when the associated object (or a certain percentage thereof) is not within the browser viewport. When a throttle-down event is invoked for an associated object, a frame rate of the associated object (or other parameter thereof) is throttled down. As an example, although each associated object is typically rendered on the browser at a frame rate of 24 fps (or other frame rate) (e.g., when the associated object is within the browser viewport), the browser throttles down the frame rate of the associated object to a frame rate of 1 fps when it detects that the associated object is not within the browser viewport. Upon invoking the throttle-down event, the browser provides information indicating the throttle-down event (e.g., state information specifying that the throttle-down event was invoked for the associated object) to the viewing quality assessment system 140.

When the viewing quality assessment system 140 processes the indication of the throttle-down event, it determines that the associated object (for which the throttle-down event was invoked) is not currently within the browser viewport (and/or not viewable to a user). The viewing quality assessment system 140 estimates the viewing quality of the media object based on the number of the associated objects not viewable to a user, the number of the associated objects viewable to a user, etc. As an example, if the viewing quality assessment system 140 determines that a certain threshold number of the associated objects are not within the browser viewport, it determines that the media object (or at least a certain percentage thereof) is not within the browser viewport (and/or not viewable to a user). As another example, the viewing quality assessment system 140 estimates the extent to which the media object is within (or not within) the browser viewport (and/or viewable or not viewable to a user) based on the number of the associated objects not viewable to a user, the number of the associated objects viewable to a user, etc. In this way, by using such throttle event indications, the viewing quality assessment system 140 need not necessarily receive information identifying the actual frame rates (or the absolute values of other delivery conditions) of the associated objects to estimate the viewing equality of the associated objects and/or the viewing quality of the media object.

The content sources 160 include multiple content sources 160a, 160b, 160n. A content source may correspond to a web page host corresponding to an entity, whether it be an individual, a business, or an organization such as USPTO.gov; a content provider such as CNN.com and Yahoo.com; or a content feed source such as Twitter or blogs. Both the advertising delivery system 130 and the viewing quality assessment system 140 may access information from any of the content sources 160a, 160b, . . . 160n. In an embodiment, for example, advertising delivery system 130 obtains content related to an advertisement from one or more of content sources 160a, 160b, . . . 160n to generate the advertisement and/or provide for presentation with the advertisement to a user.

Figure 2:
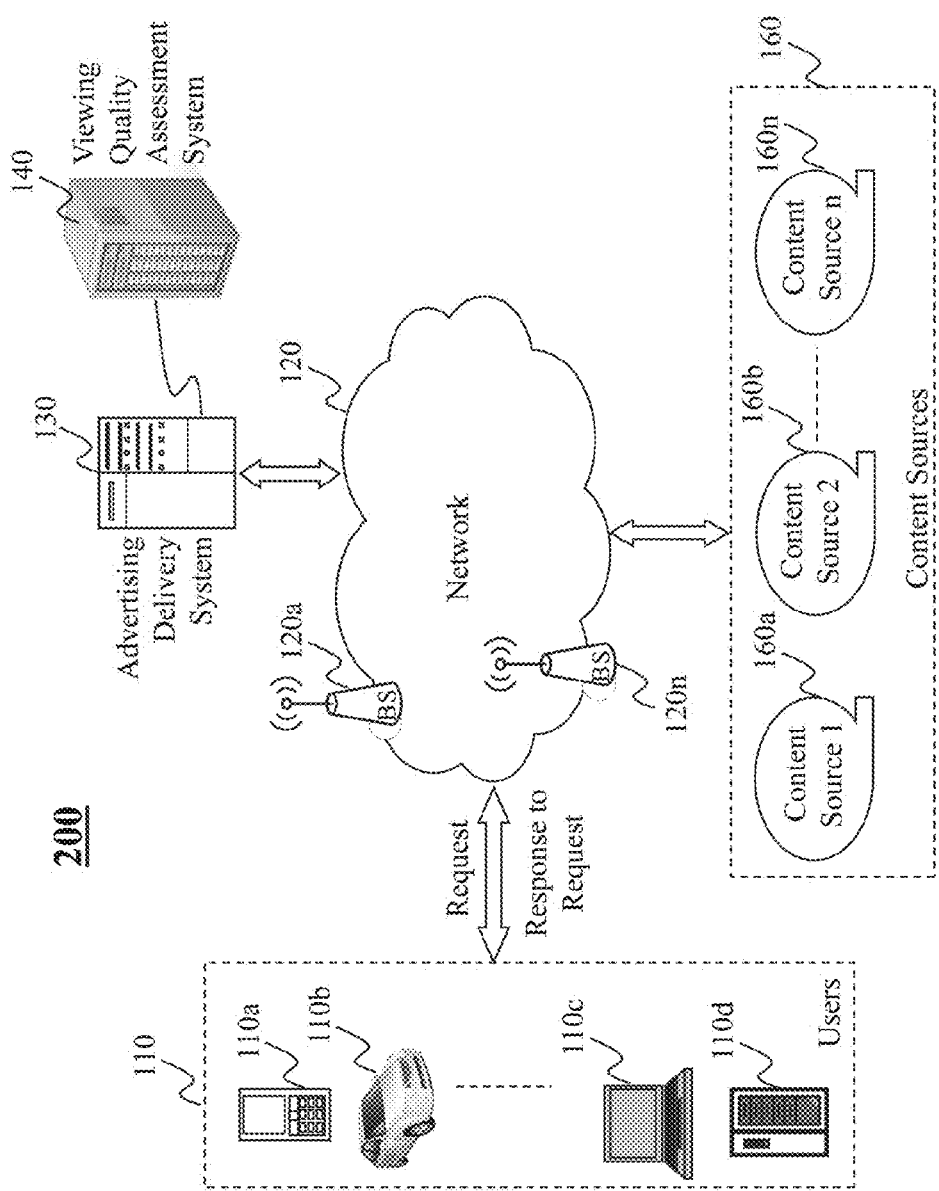

FIG. 2 is a high level depiction of an exemplary system 200 in which the viewing quality assessment system 140 is deployed to assess viewing quality of media objects (e.g., advertisements), according to an embodiment of the present teaching. The exemplary networked environment 200 in this embodiment is similar to the exemplary networked environment 100 in FIG. 1, except that the viewing quality assessment system 140 in this embodiment connects to the network 120 via the advertising delivery system 130. For example, the viewing quality assessment system 140 may serve as a back-end system of the advertising delivery system 130.

Figure 3:
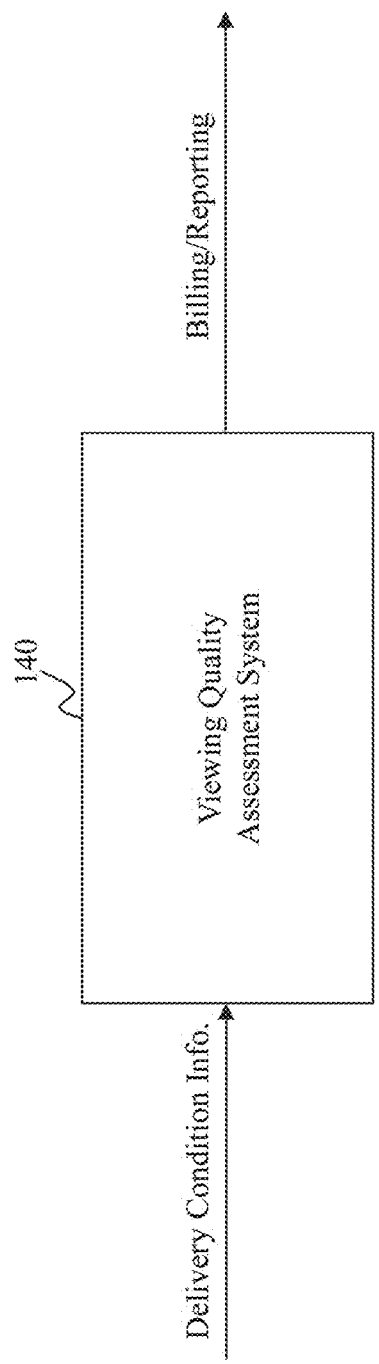
FIG. 3 is a high level exemplary system diagram of a viewing quality assessment system, according to an embodiment of the present teaching.

FIG. 3 depicts the inputs and output of the viewing quality assessment system 140, according to an embodiment of the present teaching. As shown, the viewing quality assessment system 140 receives, as input, information regarding one or more delivery conditions of a media object, objects associated with the media object, or other objects. The delivery condition information includes: (1) one or more absolute values of a bandwidth of a network over which an object is delivered, a latency of the network, a response time of the object, a frame rate of the object, a compression ratio of the object, etc.; (2) one or more relative values of a bandwidth of a network over which an object is delivered, a latency of the network, a response time of the object, a frame rate of the object, a compression ratio of the object, etc.; (3) a delivery-condition-related state of the object (e.g., throttled-down state, throttled-up state, non-throttled state, etc.); or (4) other information. By analyzing the delivery condition information, the viewing quality assessment system 140 can estimate viewing quality of media objects (e.g., advertisements), and provide the viewing quality for the media objects for reporting to one or more business entities (e.g., to generate billing information and/or reports related to the viewing quality of the media objects).

Figure 4:
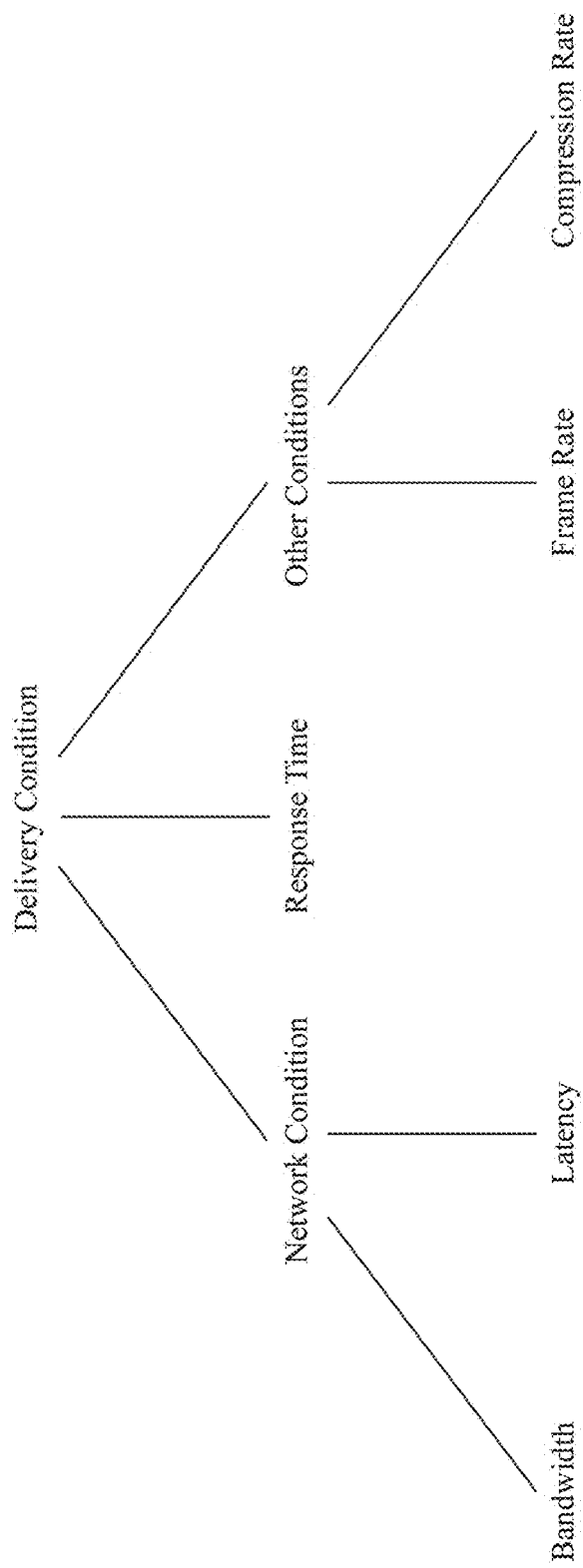
FIG. 4 is a high level exemplary diagram of different delivery conditions, according to an embodiment of the present teaching.

FIG. 4 is a high level exemplary diagram of different delivery conditions, according to an embodiment of the present teaching. As illustrated in FIG. 4, delivery conditions of an object may include conditions of a network (e.g., bandwidth, latency, etc.) over which the object is delivered, a response time of the object, a frame rate of the object, a compression ratio of the object, or other delivery condition.

Figure 5:
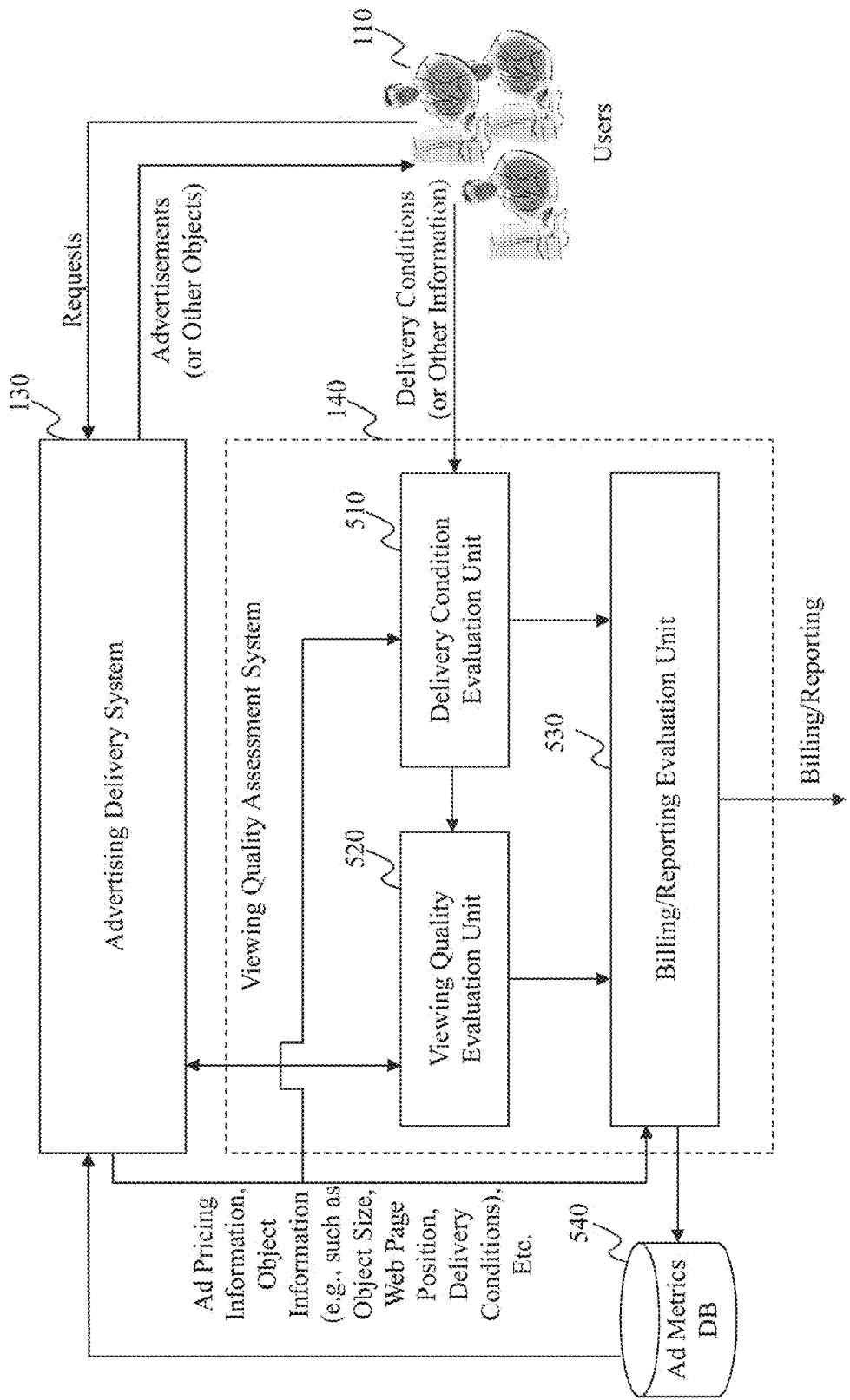
FIG. 5 is a high level exemplary system diagram of an advertising delivery system and a viewing quality assessment system, according to an embodiment of the present teaching.

FIG. 5 depicts a high level exemplary system diagram of the advertising delivery system 130 and the viewing quality assessment system 140, according to an embodiment of the present teaching. As shown, users 110 submit requests for content (e.g., to load a webpage that includes an advertisement), which may cause requests for advertisements to be provided to the advertising delivery system 130. In response, advertising delivery system 130 provides one or more advertisements (or other objects) for presentation to users 110. User devices (or an application thereof) of users 110 render the advertisements and provide delivery condition information (or other information) to the viewing quality assessment system 140.

As depicted in FIG. 5, the viewing quality assessment system 140 comprises a delivery condition evaluation unit 510, a viewing quality evaluation unit 520, and a billing and/or reporting evaluation unit 530. In an embodiment, when information regarding one or more delivery conditions of a media object (served at a user device) is received at the viewing quality assessment system 140, delivery condition evaluation unit 510 processes the delivery condition information to determine the delivery conditions of the media object, and provides its determinations to viewing quality evaluation unit 520. The determinations (provided to viewing quality evaluation unit 520) may include a determination of whether the delivery conditions of the media object satisfy one or more condition thresholds, a determination of a state of the media object, a determination that a throttle event (e.g., a throttle-down event, a throttle-up event, etc.) was invoked with respect to the media object, or other determinations.

In an embodiment, when information regarding one or more delivery conditions of one or more objects associated with the media object is received at the viewing quality assessment system 140, delivery condition evaluation unit 510 processes the delivery condition information to determine the delivery conditions of the associated objects, and provides its determinations to viewing quality evaluation unit 520. The determinations (provided to viewing quality evaluation unit 520) may include a determination of whether the delivery conditions of an associated object satisfy one or more condition thresholds, a determination of a state of the associated object, a determination that a throttle event (e.g., a throttle-down event, a throttle-up event, etc.) was invoked with respect to the associated object, or other determinations.

In some embodiments, advertising delivery system 130 provides information regarding one or more advertising pricing parameters to the viewing quality assessment system 140. The advertising pricing parameters include, for example, one or more condition thresholds (e.g., predetermined by advertising delivery system 130 in accordance with an agreement between an advertiser and its business customers) that govern whether (or how much) is to be charged for serving the media object. In one use case, for example, if the compression ratio is higher than a certain compression rate threshold, the viewing quality of the media object will likely be degraded below an acceptable quality of the customer. As such, the customer of the advertiser may be charged a discounted rate (or not charged at all) for serving the media object if the compression ratio is higher than the compression ratio threshold. In another use case, if the latency of the network over which the media object is delivered is higher than a certain latency threshold, and the media object is a video advertisement, the playback of the video advertisement will likely load slowly and pause frequently. Thus, the customer of the advertiser may be charged a discounted rate (or not charged at all) for serving the media object if the network latency is higher than the latency threshold. In yet another use case, if the frame rate of the media object is below a certain frame rate threshold at a given time, the media object is likely either not within the viewport of a browser at which it is rendered, or the rendering of the media object is degraded below an acceptable quality of the customer. Therefore, the customer of the advertiser may be charged a discounted rate (or not charged at all) for serving the media object if the frame rate of the media object is below the frame rate threshold (e.g., depending on how long or how often the frame rate of the media object is below the frame rate threshold). Delivery condition evaluation unit 510 may utilize the condition thresholds (provided by the advertising delivery system 130) or other condition thresholds to evaluate the delivery conditions of the media object, and provide its evaluations to viewing quality evaluation unit 520 and/or billing and/or reporting evaluation unit 530.

Viewing quality evaluation unit 520 estimates a viewing quality of the media object and provides its estimations to billing and/or reporting evaluation unit 530. As shown in FIG. 5, in some embodiments, viewing quality evaluation unit 520 provides its estimations to advertising delivery system 130, which may, for example, allow advertising system 130 to perform its own analysis or generate its own reports regarding viewing quality of advertisements that it provides for presentation to users 110.

In an embodiment, viewing quality evaluation unit 520 estimates the viewing quality of the media object based on the determinations (provided by delivery condition evaluation unit 510) related to the delivery conditions of the media object. As an example, if a frame rate of the media object does not satisfy a predetermined frame rate threshold (related to whether the media object rendered on a browser is within the browser viewport) at a given time, it is determined that the media object was not within the browser viewport at the given time and, thus, not viewable to a user at the given time. As another example, if frame rates of at least some of the objects associated with the media object do not satisfy the predetermined frame rate threshold at a given time, it is determined that those associated objects were not within the browser viewport at the given time and, thus, not viewable to a user at the given time. Viewing quality evaluation unit 520 then estimates the viewing quality of the media object (e.g., whether or the extent to which the media object is viewable to a user) based on the number of the associated objects having frame rates that do not satisfy the frame rate threshold, the number of the associated objects having frame rates that satisfy the frame rate threshold, etc.

In yet another example, the actual frame rate(s) (or absolute values of other delivery conditions) need not necessarily be received (or otherwise known) by the viewing quality assessment system 140 for it to estimate the viewing quality of the media object. In one scenario, for example, a browser (or other application) is programmed to invoke a throttle-down event when the media object falls outside of the browser viewport and to invoke a throttle-up event when the media object falls back within the browser viewport. The throttle-down event causes the media object to be rendered at a frame rate equal to or less than the predetermined frame rate threshold (which the frame rate is compared to determine whether the media object is within the browser viewport). The throttle-up event causes the media object to be rendered at a frame rate greater than the predetermined frame threshold. When the browser invokes a throttle event, an indication of the throttle event and/or other information (e.g., a time at which the throttle event was invoked) is provided to the viewing quality assessment system 140 in real-time (e.g., by the browser or other application) and/or stored for later transmission to the viewing quality assessment system 140. Upon receipt of these throttle event indications, viewing quality evaluation unit 520 processes the throttle event indications to determine whether the media object was within the browser viewport at one or more given times. The viewing quality evaluation unit 520 then estimates the viewing quality of the media object based on whether the media object was within the browser viewport at the given times.

In another scenario, the browser is programmed to invoke a throttle-down event with respect to an associated object of the media object when the associated object falls outside of the browser viewport, and to invoke a throttle-up event when the associated object falls back within the browser viewport. The throttle-down event causes the associated object to be rendered at a frame rate equal to or less than the predetermined frame rate threshold (which the frame rate is compared to determine whether the associated object is within the browser viewport). The throttle-up event causes the associated object to be rendered at a frame rate greater than the predetermined frame threshold. When the browser invokes a throttle event, an indication of the throttle event and/or other information (e.g., a time at which the throttle event was invoked) is provided to the viewing quality assessment system 140 in real-time (e.g., by the browser or other application) and/or stored for later transmission to the viewing quality assessment system 140. Upon receipt of these throttle event indications, the viewing quality evaluation unit 520 processes the throttle event indications to determine whether the associated object was within the browser viewport. Viewing quality evaluation unit 520 then estimates the viewing quality of the media object based on the number of the associated objects within the viewport at one or more given times, the number of the associated objects outside the viewport at the given times, etc.

As depicted in FIG. 5, the advertising delivery system 130 provides advertising pricing information, object information (e.g., object dimensions, web page position, delivery conditions, etc.) to the viewing quality assessment system 140. In an embodiment, billing and/or reporting evaluation unit 530 processes such information (provided by advertising delivery system 130), estimations provided by viewing quality evaluation unit 520, determinations provided by delivery condition evaluation unit 510 (e.g., whether certain condition thresholds were satisfied), or other information to: (1) determine billing information; (2) generate reports related to the viewing quality of the media object; or (3) perform other operations. In some embodiments, billing and/or reporting evaluation unit 530 provides the billing information, the reports, or other information to ad metrics database 540. Advertising delivery system 130 may, for example, obtain information from ad metrics database 540 for use in: (1) analyzing the effectiveness of the media objects (e.g., advertisements) and/or its placements within various websites; (2) selecting new media objects for presentation to users 110; or (3) performing other operations.

Figure 6:
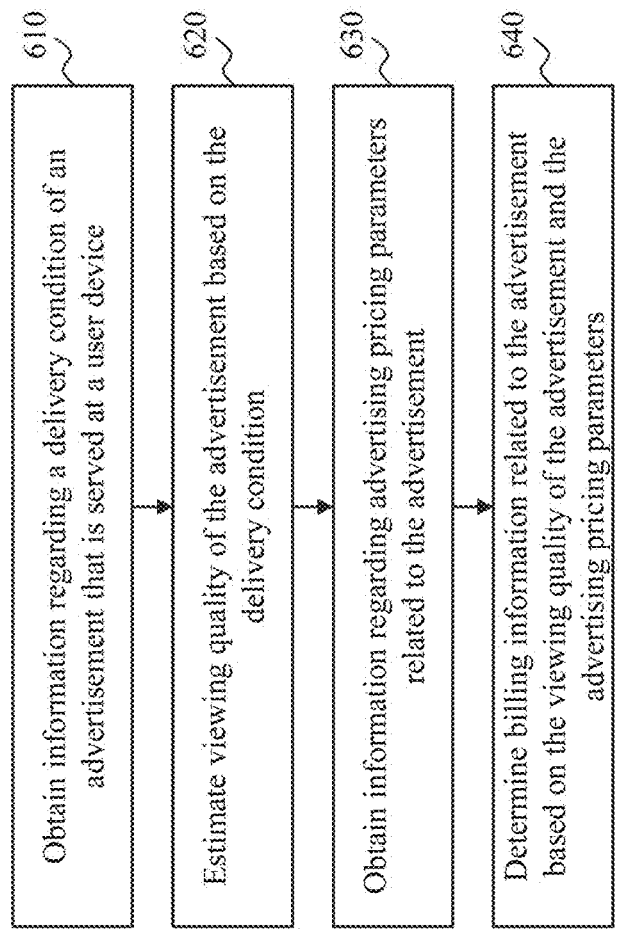
FIG. 6 is a flowchart of an exemplary process of assessing billing information related to advertisements, according to an embodiment of the present teaching.

FIG. 6 is a flowchart of an exemplary process of assessing billing information related to advertisements, according to an embodiment of the present teaching. As shown, at 610, information regarding a delivery condition of an advertisement (that is served at a user device) is obtained. The delivery condition information includes: (1) one or more absolute values of a bandwidth of a network over which an object is delivered, a latency of the network, a response time of the object, a frame rate of the object, a compression ratio of the object, etc.; (2) one or more relative values of a bandwidth of a network over which an object is delivered, a latency of the network, a response time of the object, a frame rate of the object, a compression ratio of the object, etc.; (3) a delivery-condition-related state of the object (e.g., throttled-down state, throttled-up state, non-throttled state, etc.); or (4) other information.

At 620, viewing quality of the advertisement is estimated based on the delivery conditions of the media object. In an embodiment, the viewing quality of the advertisement is estimated based on whether the delivery conditions of the media object satisfy one or more condition thresholds. In another embodiment, the viewing quality is estimated by determining whether (or the extent to which) the advertisement is viewable to a user (of the user device at which the media object is served) based on the delivery conditions of the media object.

At 630, information regarding advertising pricing parameters related to the advertisement is obtained. Advertising pricing parameters include one or more rates at which to charge for serving the advertisement, one or more condition thresholds that are to be satisfied (e.g., by delivery conditions, viewing quality, etc., of the media object) before respective rates can be charged, or other parameters.

At 640, billing information related to the advertisement is determined based on the viewing quality of the advertisement and the advertising pricing parameters. In some embodiments, a report (indicating the viewing quality of the advertisement) is generated based on the viewing quality of the advertisement. As an example, a report indicating viewing quality associated with at least a portion of an advertising campaign for an advertising customer is generated based on the viewing quality of the advertisement and at least one other advertisement, where the advertising campaign includes the advertisement and the other advertisement.

Figure 7:
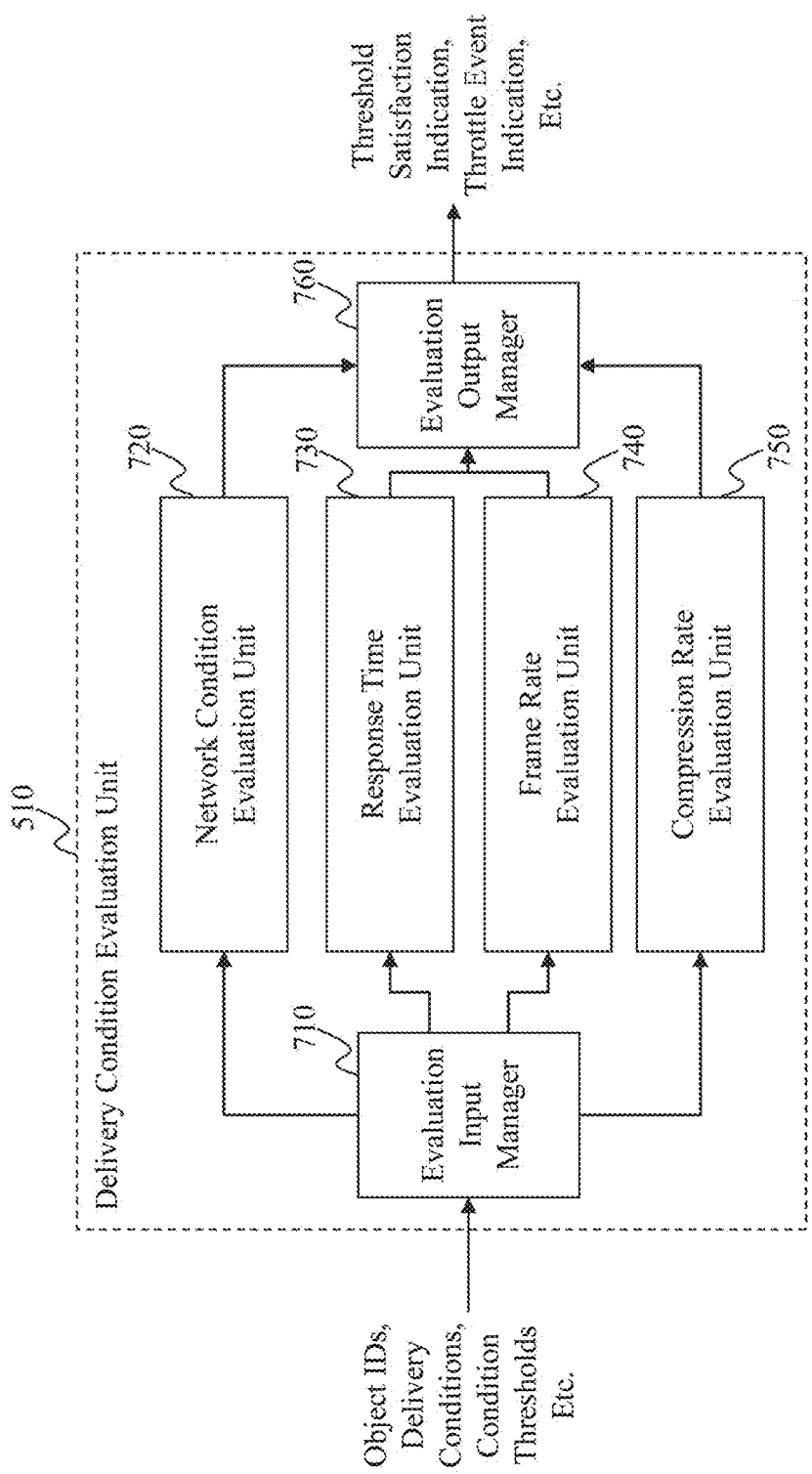
FIG. 7 is a high level exemplary system diagram of a delivery condition evaluation unit, according to an embodiment of the present teaching.

FIG. 7 is a high level exemplary system diagram of a delivery condition evaluation unit, according to an embodiment of the present teaching. As illustrated, the delivery condition evaluation unit 510 comprises an evaluation input manager 710, a network condition evaluation unit 720, a response time evaluation unit 730, a frame rate evaluation unit 740, a compression rate evaluation unit 750, and an evaluation output manager 760. As an example, upon receipt of input (e.g., object identifiers, delivery conditions, condition thresholds, etc.), evaluation input manager 720 processes the input to determine the appropriate components to which one or more portions of the input are to be provided. In one use case, an object's identifier, information regarding a condition of a network over which the object is delivered, and/or information regarding a network condition threshold is provided to the network condition evaluation unit 720. In another use case, an object's identifier, information regarding a response time of the object, and/or information regarding a response time threshold is provided to the response time evaluation unit 730. In yet another use case, an object's identifier, information regarding a frame rate of the object, and/or information regarding a frame rate threshold is provided to the frame rate evaluation unit 740. In a further use case, an object's identifier, information regarding a compression rate of the object, and/or information regarding a compression rate threshold is provided to the compression rate evaluation unit 750. Upon processing such information, respectively, the various evaluation units 720, 730, 740, and 750 provide their evaluations (e.g., which delivery conditions of the object satisfy the respective condition thresholds, whether the object was throttled, etc.) to the evaluation output manager 760. The evaluation output manager 760 processes the evaluations to determine the appropriate components (e.g., outside the delivery condition evaluation unit 510) to which one or more of the evaluations are to be provided.

FIGS. 8A and 8B illustrate exemplary presentations of advertisements, according to different embodiments of the present teaching. As shown in FIG. 8A, an advertisement 810 may be provided for presentation by providing a single media object (e.g., a video advertisement) for presentation to a user at a given time. As discussed, in one use case, the viewing quality of the advertisement is estimated based on one or more delivery conditions of the advertisement at one or more given times. For example, the viewing quality of the advertisement is estimated based on a delivery condition of a first portion of the advertisement (e.g., a portion corresponding to a first time interval of the video advertisement) at a first time, a delivery condition of a second portion of the advertisement (e.g., a portion corresponding to a second time interval of the video advertisement), and so on.

As shown in FIG. 8B, an advertisement 820 may be provided for presentation by providing respective portions of multiple media objects 830 at a given time. The multiple media objects (e.g., multiple videos) may be provided for presentation such that they appear to be a single video object (e.g., a single video) from the perspective of a user or such that they appear to be part of a single advertisement. In some embodiments, a browser (or other application) of a user device (at which an advertisement is served) is programmed to invoke a throttle-down event with respect to an object only when the object is completely outside the browser viewport, and to invoke a throttle-up event with respect to the object when the object is at least partially within the browser viewport. In such embodiments, for example, an advertisement that is represented by a single media object at a given time (e.g., advertisement 810 of FIG. 8A) would only be throttled down when the advertisement (or the single media object) is completely outside the browser viewport. As such, an indication that the advertisement is not throttled at a given time may not by itself be a good indication of how much of the advertisement is viewable to a user at the given time. However, an advertisement that is represented by multiple media objects at a given time (e.g., advertisement 820 of FIG. 8B) can have some portions of the advertisement throttled down and some portions of the advertisement not throttled down at the same time, enabling indications of which particular portions of the advertisement are outside the browser viewport. Thus, such indications together may be a better indication of how much of the advertisement is viewable to a user at a given time (e.g., as compared to advertisement 810 of FIG. 8A).

Figure 9:
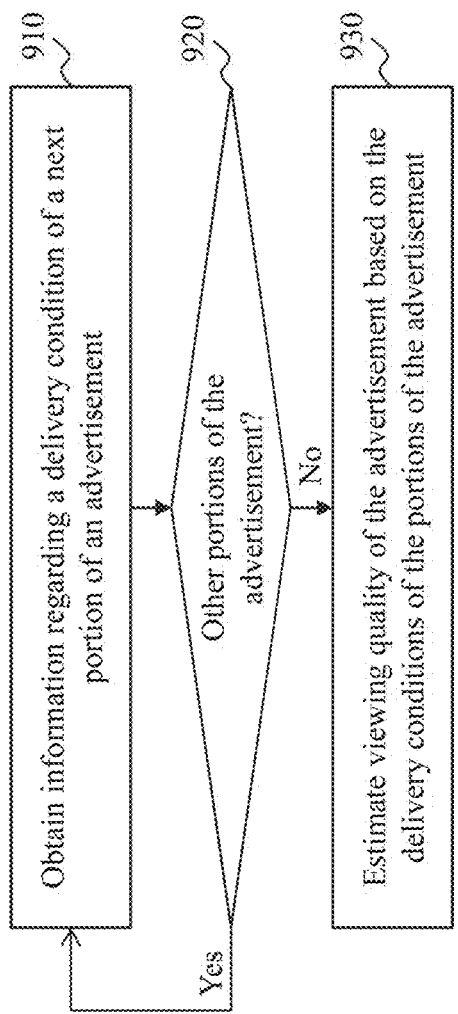
FIG. 9 is a flowchart of an exemplary process of assessing viewing quality of an advertisement based on delivery conditions of portions of the advertisement, according to an embodiment of the present teaching.

FIG. 9 is a flowchart of an exemplary process of assessing viewing quality of an advertisement based on delivery conditions of portions of the advertisement, according to an embodiment of the present teaching. As shown, at 910, information regarding a delivery condition of a portion of an advertisement is obtained. The advertisement may, for example, be an advertisement as described with respect to FIG. 8A (e.g., single media object at a given time) or an advertisement as described with respect to FIG. 8B (e.g., multiple media objects at a given time).

At 920, a determination of whether there is information regarding delivery conditions of other portions of the advertisement that has not been (and should be) obtained is made. The other portions may, for example, include: (1) portions of the advertisement that are rendered at a different time than one or more portions of the advertisement for which delivery condition information has been obtained (e.g., different time interval of a video advertisement); or (2) portions of the advertisement that are rendered the same time as the advertisement portions for which delivery condition information has been obtained.

If such another portion of the advertisement exists, information regarding a delivery condition of a next portion of the advertisement is obtained at 910. Otherwise, at 930, viewing quality of the advertisement is estimated based on the delivery conditions of the portions of the advertisement.

Figure 10:
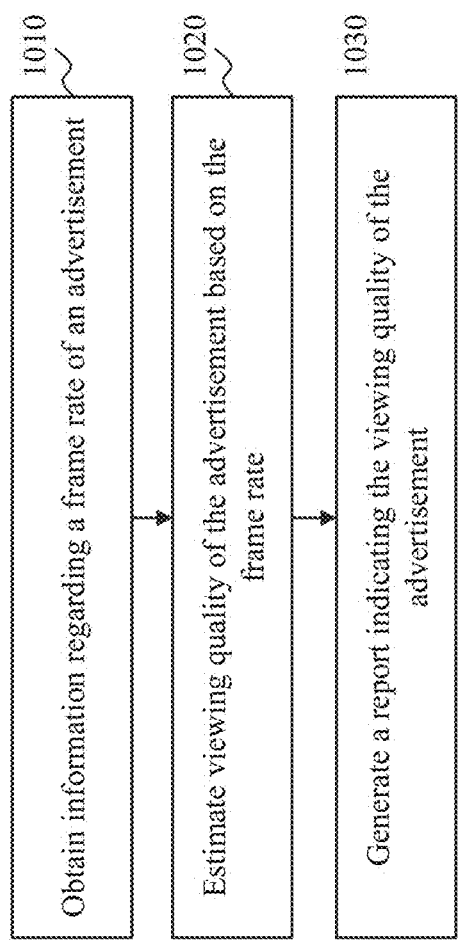
FIG. 10 is a flowchart of an exemplary process of assessing viewing quality of an advertisement based on a frame rate of the advertisement, according to an embodiment of the present teaching.

FIG. 10 is a flowchart of an exemplary process of assessing viewing quality of an advertisement based on a frame rate of the advertisement, according to an embodiment of the present teaching. As shown, at 1010, information regarding a frame rate of an advertisement is obtained.

At 1020, viewing quality of the advertisement is estimated based on the frame rate of the advertisement. As an example, the viewing quality of the advertisement is estimated by determining whether (or the extent to which) the advertisement is viewable to a user based on the frame rate of the advertisement.

At 1030, a report indicating the viewing quality of the advertisement is generated. As an example, a report indicating viewing quality associated with at least a portion of an advertising campaign for an advertising customer is generated based on the viewing quality of the advertisement and at least one other advertisement, where the advertising campaign includes the advertisement and the other advertisement.

Figure 11:
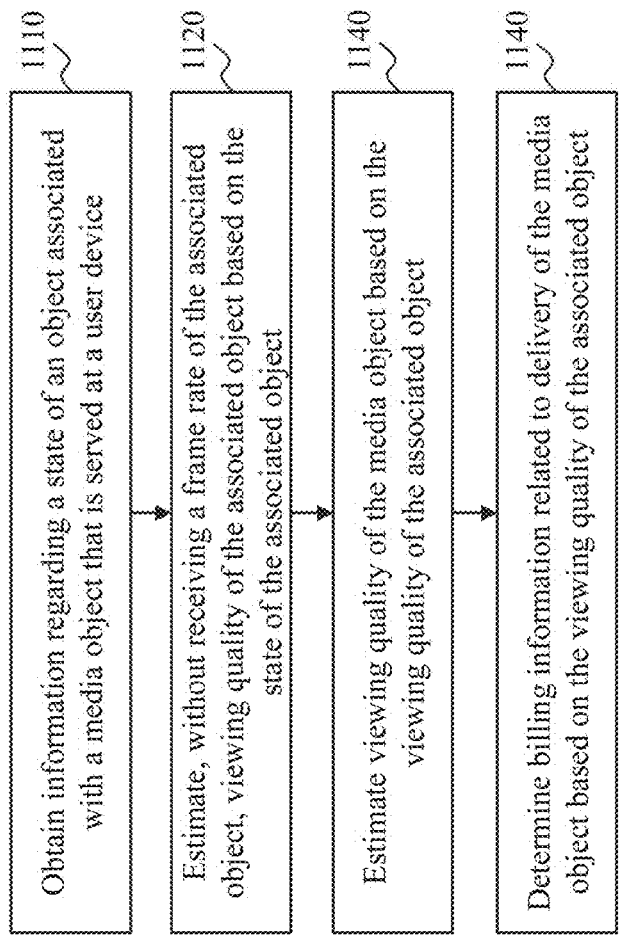
FIG. 11 is a flowchart of an exemplary process of assessing viewing quality of a media object based on a state of an object associated with the media object, according to an embodiment of the present teaching.

FIG. 11 is a flowchart of an exemplary process of assessing viewing quality of a media object based on a state of an object associated with the media object, according to an embodiment of the present teaching. As shown, at 1110, information regarding a state of an object associated with a media object (that is served at a user device) is obtained. As an example, the state of the associated object may be a throttled-down state, a throttled-up state, a non-throttled state, or other state. The associated object may be a supplemental object for tracking and/or monitoring aspects of the media object.

At 1120, viewing quality of the associated object is estimated based on the state of the associated object, without receiving a frame rate of the object. At 1130, viewing quality of the media object is estimated based on the viewing quality of the associated object. As an example, if the number of associated objects estimated to be viewable to a user is greater than the number of associated objects estimated to not be viewable to a user, then this is an indication that the media object (or at least a sufficient portion thereof) is viewable to the user.

At 1140, billing information related to delivery of the media object is determined based on the viewing quality of the associated object. As an example, an advertising customer is charged for the serving of the media object based on whether (or the extent to which) the media object is deemed to be viewable to a user. The determination of whether (or the extent to which) the media object is deemed to be viewable is based on the viewing quality of the associated object and/or other associated objects. As another example, an advertising customer is charged for the serving of the media object relative to the number of the associated objects that are estimated to be viewable, relative to the number of associated objects that are estimated not to be viewable, etc.

Figure 12:
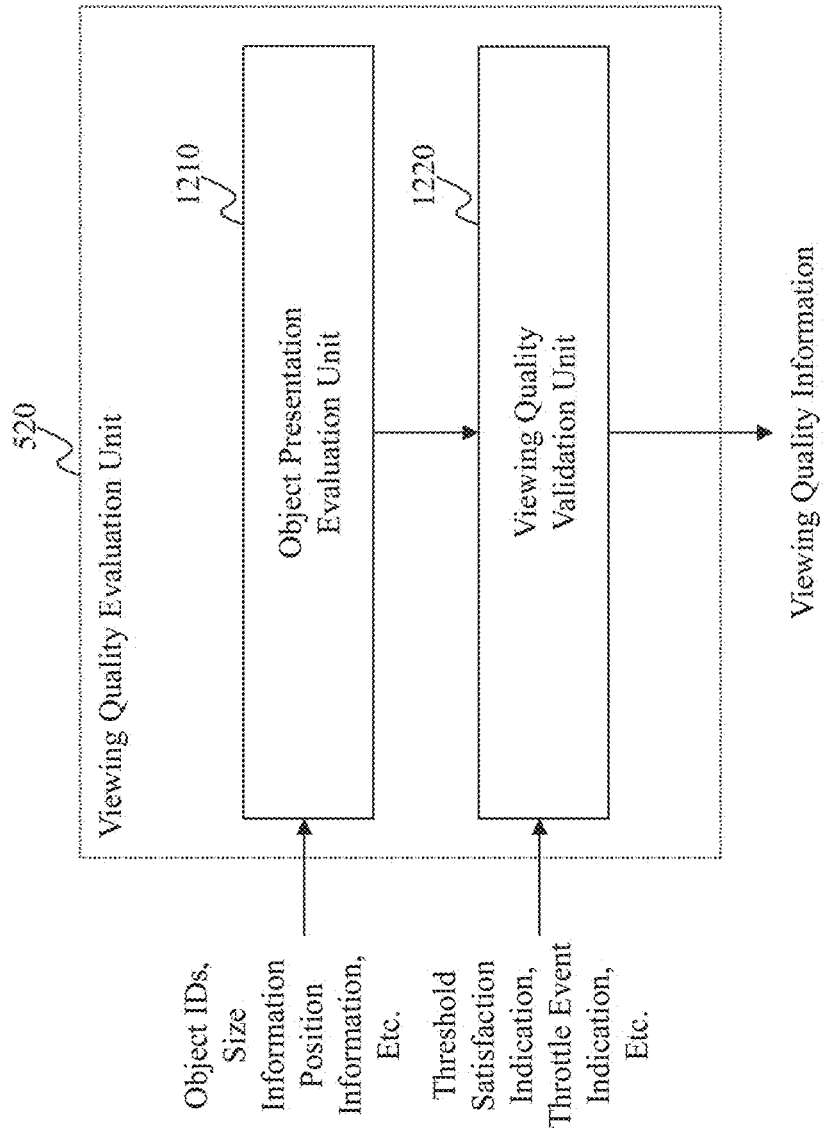
FIG. 12 is a high level exemplary system diagram of a viewing quality evaluation unit, according to an embodiment of the present teaching.

FIG. 12 is a high level exemplary system diagram of a viewing quality evaluation unit, according to an embodiment of the present teaching. As shown, the viewing quality evaluation unit 520 comprises an object presentation evaluation unit 1210 and a viewing quality validation unit 1220. In an embodiment, object presentation evaluation unit 1210 processes object identifiers, dimension information (e.g., object height and width, dimension of a webpage that includes the object, etc.), position information (e.g., object position within the webpage, which portion of the webpage is within the browser viewport, etc.), or other information (e.g., received from the user device) to optimize the information for the viewing quality validation unit 1220 (which utilizes the information to determine whether (or the extent to which) a rendered object is viewable).

In some embodiments, Javascript (or other programming language) may be utilized to obtain and/or process the object identifier, the dimension information, the position information, or other information to determine whether (or the extent to which) a rendered object is viewable to a user. However, due to the natural limitations of Javascript, validation of the viewing quality of a rendered object purely using information obtained from Javascript served with the object may not be accurate. As an example, such validation purely using Javascript may fail to indicate an object rendered within the viewport of a browser as viewable to a user when the browser is not the active window that the user is currently using even, if the object is clearly in-view from the perspective of the user. As such, in an embodiment, feedback from the browser that does not necessarily rely on Javascript (e.g., information regarding a delivery condition of the object) may be utilized to supplement or replace information obtained via Javascript operations.

In an embodiment, the viewing quality validation unit 1220 processes condition threshold satisfaction indications, throttle event indications, or other information to determine whether (or the extent to which) a rendered object is viewable to a user.

Figure 13:
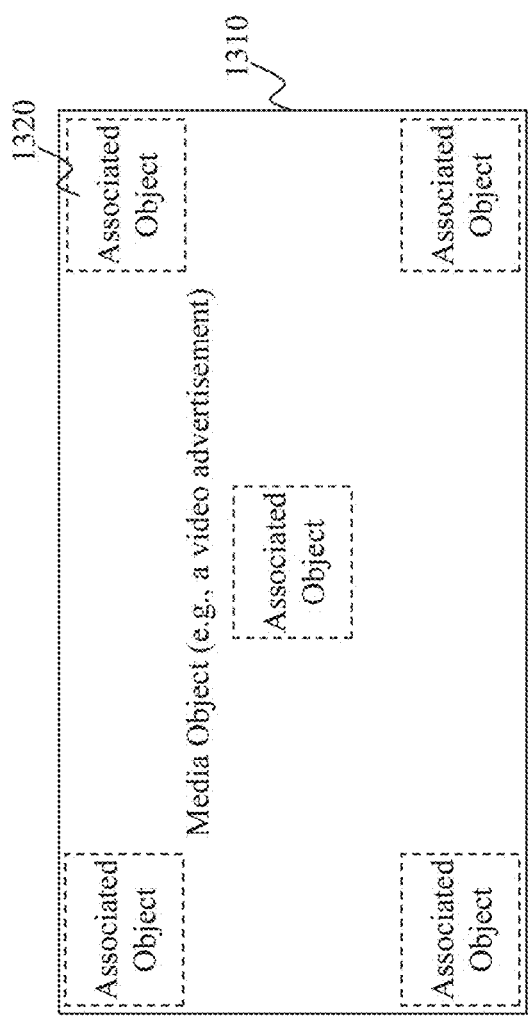
FIG. 13 illustrates an exemplary presentation of an advertisement and its associated objects, according to different embodiments of the present teaching.

FIG. 13 illustrates an exemplary presentation of an advertisement and its associated objects, according to different embodiments of the present teaching. As shown, an advertisement 1310 is provided for presentation to a user and one or more associated objects 1320 are provided behind the advertisement 1310 (as indicated by dotted lines) at specific positions relative to the advertisement 1310. In one use case, a browser (or other application) that renders the advertisement 1310 and the associated objects 1320 is programmed to invoke a throttle-down event with respect to an object (e.g., the advertisement 1310, the associated objects, etc.) when the object is completely outside the browser viewport, and to invoke a throttle-up event with respect to an object when the object is at least partially within the browser viewport. As such, when a portion of the advertisement 1310 falls outside the browser viewport (without the entirety of the advertisement falling outside the browser viewport), the browser may not invoke a throttle-down event for the advertisement 1310. However, when a portion of the advertisement falls outside the browser viewport, the browser invokes throttle-down events for any associated objects 1320 that are completely within the portion of the advertisement outside the browser viewport. Viewing quality assessment system 140 obtains indications of the throttle-down events from the browser (or other application), and processes the throttle-down event indications to determine whether (or the extent to which) the advertisement 1310 is viewable to a user.

In another use case, with respect to FIG. 13, if viewing quality assessment system 140 determines (e.g., based on the throttle events) that at most 2 of the 5 associated objects 1320 are throttled down (e.g., slowed frame rate) at a given time, it may mark the advertisement 1310 as viewable to a user at the given time. Otherwise, if viewing quality assessment system 140 determines that at least 3 of the 5 associated objects are throttled down at the given time, it may mark the advertisement 1310 as not viewable to a user at the given time. Other factors may, of course, be utilized to estimate whether (or the extent to which) the advertisement is viewable to a user.

In a further use case, with respect to FIG. 13, the viewing quality assessment system may repeat these estimations at multiple given times to estimate the time period (e.g., absolute time period, relative time period, etc.) during which the advertisement 1310 is deemed to be viewable to a user (or during which the advertisement is deemed not to be viewable to a user). The time period may then be utilized for reporting (e.g., information related to the viewing quality of the advertisement) to one or more business entities. For example, the time period is utilized to determine billing information related to delivery of the advertisement 1310 and/or generate a report indicating the viewability of the advertisement 1310. It should be appreciated that, in other embodiments, any number, dimension, or location of associated objects 1320 may be used to assist in monitoring the viewing quality (e.g., viewability) of the advertisement 1310 (e.g., greater number of associated objects 1320 to increase the accuracy of the estimations of the viewing quality of the advertisement 1310).

Figure 14:
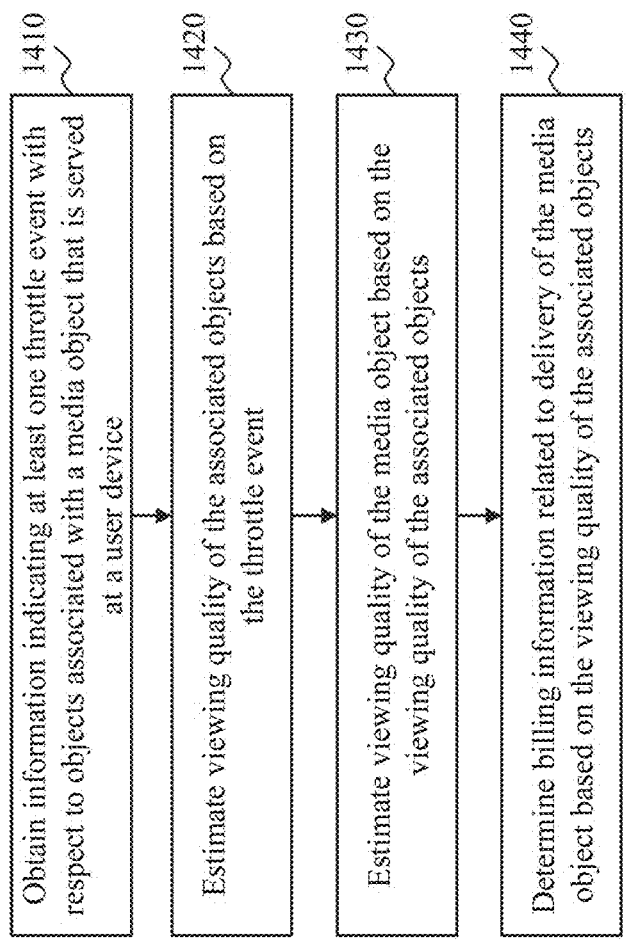
FIG. 14 is a flowchart of an exemplary process of assessing viewing quality of a media object based on a related throttle event, according to an embodiment of the present teaching.

FIG. 14 is a flowchart of an exemplary process of assessing viewing quality of a media object based on a related throttle event, according to an embodiment of the present teaching. As shown, at 1410, information indicating at least one throttle event with respect to one or more objects associated with a media object (that is served at a user device) is obtained. The throttle event may, for example, include a throttle-down event, a throttle-up event, or other event.

At 1420, viewing quality of the associated objects is estimated based on the throttle event. As an example, if an indication of a throttle-down event with respect to an associated object is obtained, the associated object may be determined to be outside the browser viewport. On the other hand, if an indication of a throttle-up event with respect to an associated object is obtained, the associated object may be determined to be within the browser viewport.

At 1430, viewing quality of the media object is estimated based on the viewing quality of the associated objects. As an example, the indications of the throttle-down events and/or the throttle-up events are used to estimate whether (or the extent to which) the media object (with which the objects are associated) is within the browser viewport (and/or is viewable to a user).

At 1440, billing information related to delivery of the media object is determined based on the viewing quality of the associated objects. As an example, an advertising customer is charged for the serving of the media object based on whether (or the extent to which) the media object is deemed to be viewable to a user. The determination of whether (or the extent to which) the media object is deemed to be viewable is based on the viewing quality of the associated object and/or other associated objects. As another example, an advertising customer is charged for the serving of the media object relative to the number of the associated objects that are estimated to be viewable, relative to the number of associated objects that are estimated not to be viewable, etc.

Figure 15:
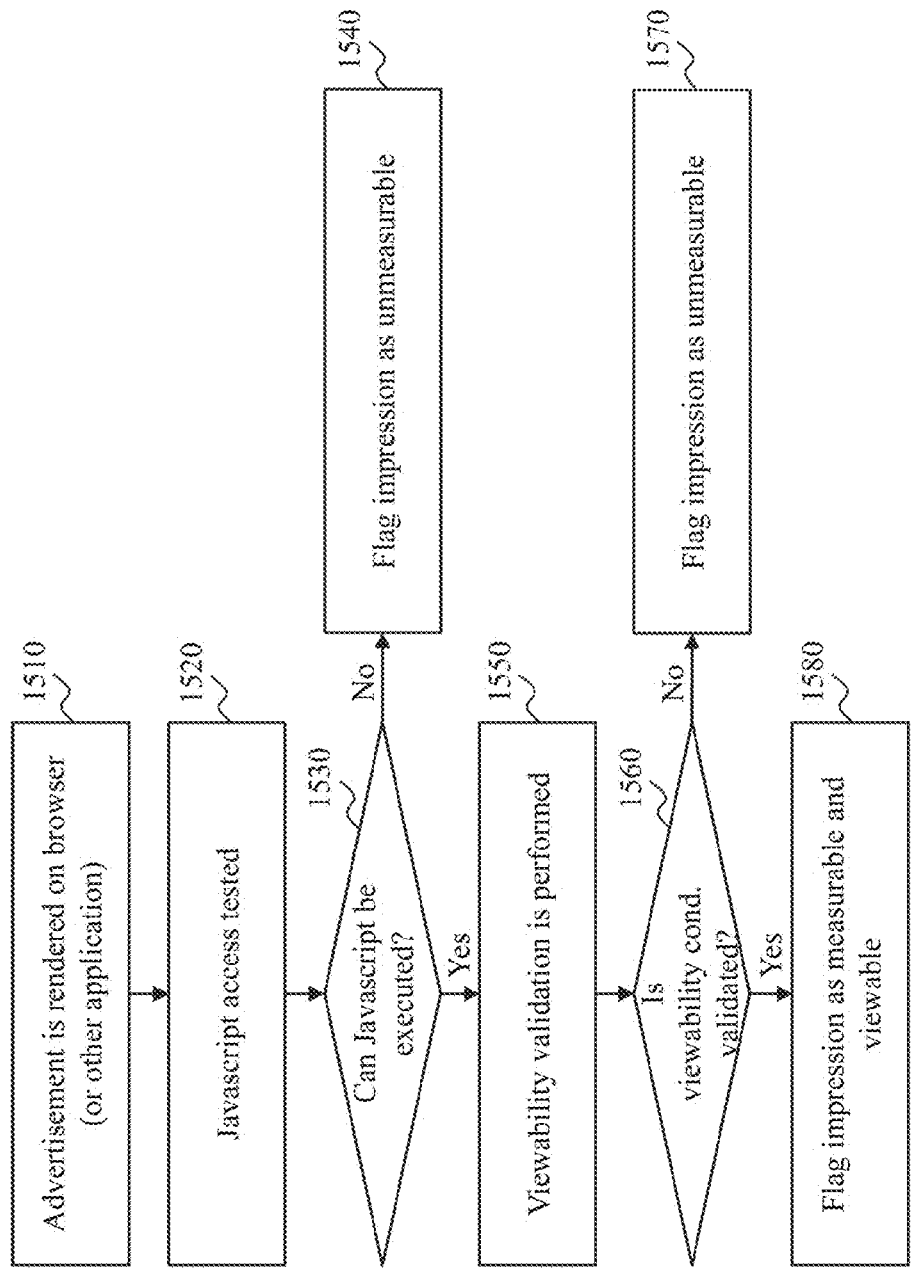
FIG. 15 is a flowchart of an exemplary process of assessing viewing quality of advertisements, according to an embodiment of the present teaching.

FIG. 15 is a flowchart of an exemplary process of assessing viewing quality of advertisements, according to an embodiment of the present teaching. As shown, in some embodiments, Javascript is still used to assess viewing quality of media objects (e.g., advertisements). At 1510, an advertisement is rendered on a browser (or other application) on a user device. At 1520, Javascript access is tested, and, at 1530, a determination of whether Javascript can be executed is effectuated. If Javascript cannot be executed, then, at 1540, the impression of the advertisement is flagged as unmeasurable and/or not viewable. Otherwise, at 1550, viewability validation is performed (as described here), and, at 1560, a determination of whether the advertisement is viewable is effectuated. If the advertisement is deemed not to be viewable, then, at 1570, the impression of the advertisement is flagged as unmeasurable and/or not viewable. Otherwise, at 1580, the impression of the advertisement is flagged as measurable and viewable.

Figure 16:
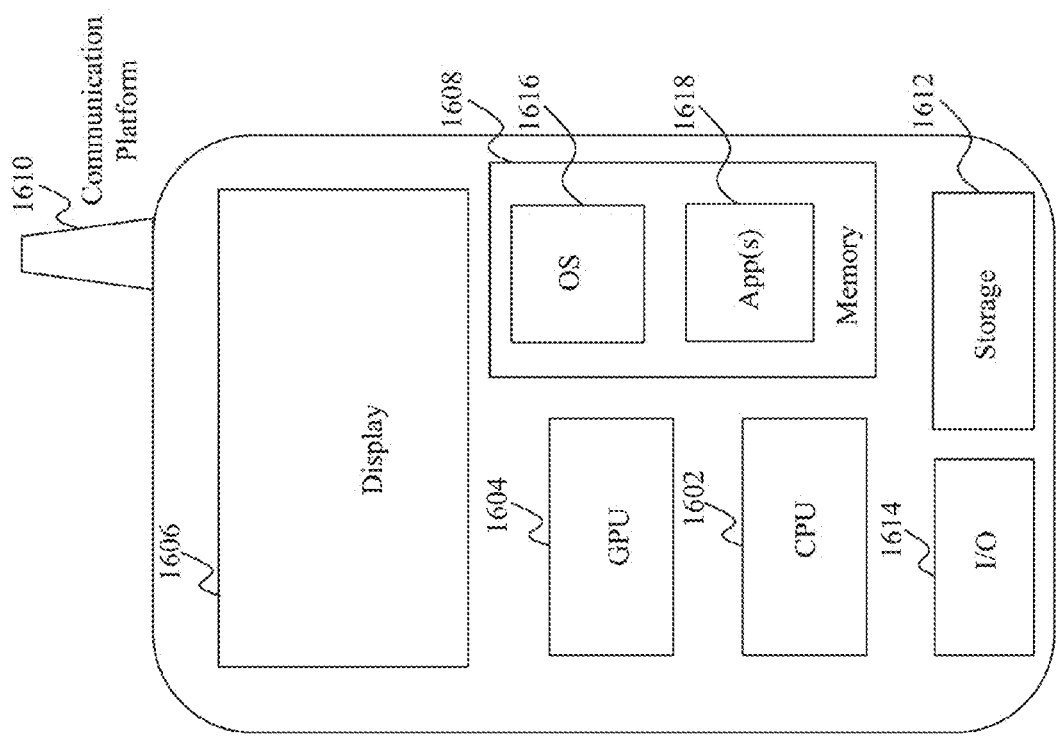
FIG. 16 depicts an architecture of a mobile device that can be used to realize the present teaching as a specialized system.

FIG. 16 depicts an architecture of a mobile device that can be used to realize the present teaching as a specialized system.

In this example, the user device on which a media object (e.g., an advertisement) is presented is a mobile device 1600, such as but not limited to, a smart phone, a tablet, a music player, a handled gaming console, or a global positioning system (GPS) receiver. The mobile device 1600 in this example includes one or more central processing units (CPUs) 1602, one or more graphic processing units (GPUs) 1604, a display 1606, a memory 1608, a communication platform 1610 (such as a wireless communication module), storage 1612, and one or more input/output (I/O) devices 1614. Any other suitable component, such as but not limited to a system bus or a controller (not shown), may also be included in the mobile device 1600. As shown in FIG. 16, a mobile operating system 1616, e.g., iOS, Android, Windows Phone, etc., and one or more applications 1618 may be loaded into the memory 1608 from the storage 1612 in order to be executed by the CPU 1602. The applications 1618 may include a browser or other application that enables a user to access content (e.g., advertisements or other content), provides presentations of content to users, monitors user activities related to presented content (e.g., whether a user has viewed an advertisement, whether the user interacted with the advertisement in other ways, etc.), reports events (e.g., throttle events), or performs other operations.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 17:
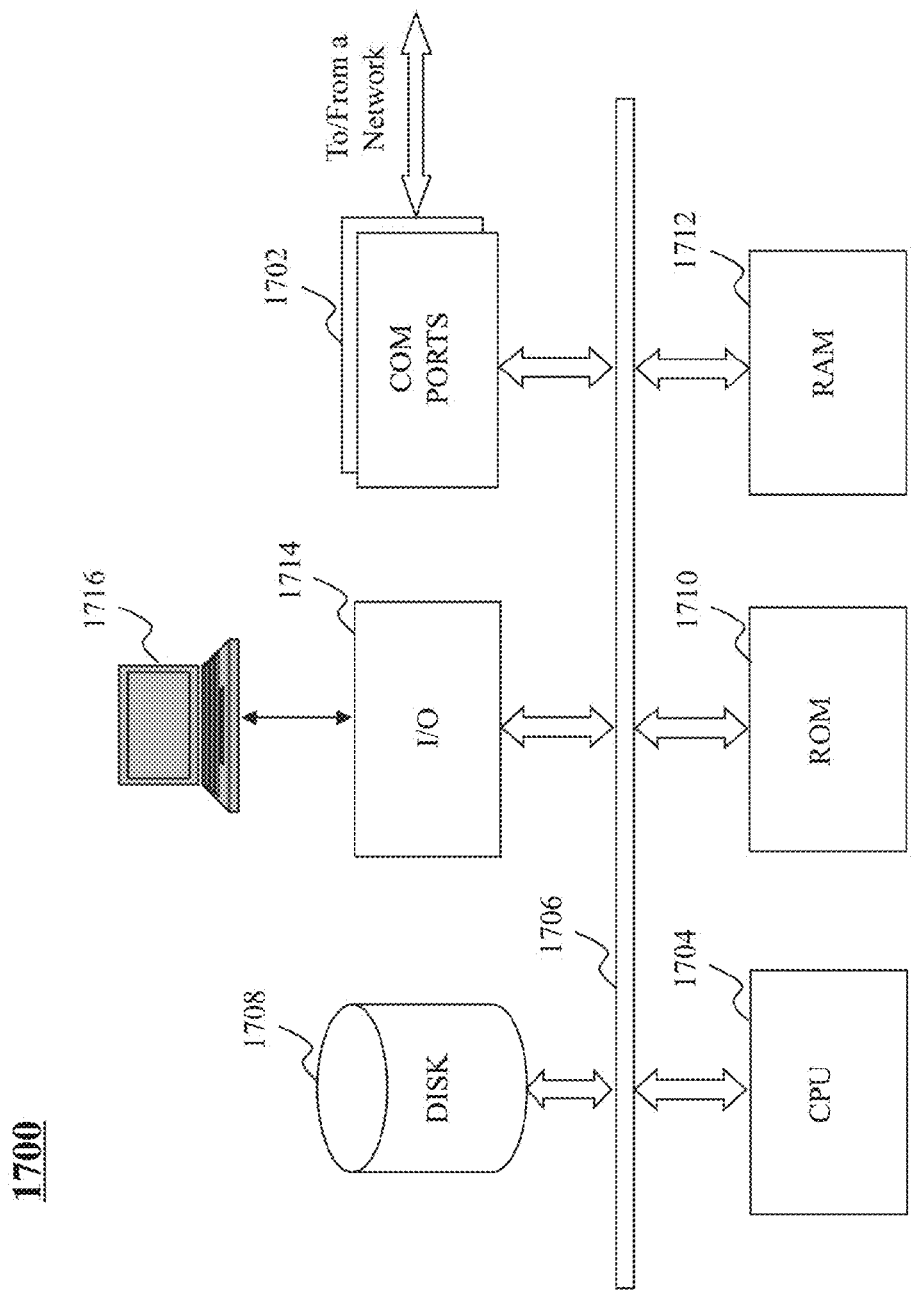
FIG. 17 depicts an architecture of a computer that can be used to realize the present teaching as a specialized system.

FIG. 17 depicts an architecture of a computer based on which the present teaching can be realized as a specialized system for assessing viewing quality of media objects. The computer may be a general-purpose computer or a special purpose computer. This computer 1700 can be used to implement any components of the viewing quality assessment architecture as described herein. Different components of the system in the present teaching can all be implemented on one or more computers such as computer 1700, via its hardware, software program, firmware, or a combination thereof. Although only one such computer is shown, for convenience, the computer functions relating to the target metric identification may be implemented in a distributed fashion on a number of similar platforms, to distribute the processing load.

The computer 1700, for example, includes COM ports 1702 connected to and from a network connected thereto to facilitate data communications. The computer 1700 also includes a central processing unit (CPU) 1704, in the form of one or more processors, for executing program instructions. The exemplary computer platform includes an internal communication bus 1706, program storage and data storage of different forms, e.g., disk 1708, read only memory (ROM) 1710, or random access memory (RAM) 1712, for various data files to be processed and/or communicated by the computer, as well as possibly program instructions to be executed by the CPU. The computer 1700 also includes an I/O component 1714, supporting input/output flows between the computer and other components therein such as user interface elements 1716. The computer 1700 may also receive programming and data via network communications.

Hence, aspects of the method of assessing viewing quality of media objects (e.g., advertisements), as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution. In addition, the components of the system as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method for assessing viewing quality of a media object, the method being implemented on a machine having at least one processor, storage, and a communication platform, the method comprising:
   receiving information indicating a throttle event with respect to each of one or more supplemental objects associated with a media object, the media object being served at a user device, the one or more supplemental objects being overlaid on or underlaid behind the media object on a web page loaded at the user device, wherein a throttle event throttles a parameter in connection with a supplemental object associated with the media object;
   estimating viewing quality of the one or more supplemental objects, that are overlaid on or underlaid behind the media object, based on the throttle event with respect to each of the one or more supplemental objects; and
   estimating viewing quality of the media object based on the viewing quality of the one or more supplemental objects that are overlaid on or underlaid behind the media object.

2. The method of claim 1, wherein the parameter comprises at least one of a frame rate or a compression ratio.

3. The method of claim 1, wherein the media object comprises a video advertisement without the one or more supplemental objects, and the one or more supplemental objects are overlaid on or underlaid behind the video advertisement, and
   wherein the step of estimating of estimating the viewing quality of the media object comprises estimating the viewing quality of the video advertisement based on the viewing quality of the one or more supplemental objects that are overlaid on or underlaid behind the video advertisement.

4. The method of claim 1, further comprising:
   determining billing information related to delivery of the media object based on the viewing quality of the one or more supplemental objects.

5. The method of claim 1, wherein the media object comprises at least one of a video or animation.

6. The method of claim 1, wherein the step of estimating the viewing quality of the one or more supplemental objects comprises processing the received throttle event information to estimate, for each of the one or more supplemental objects, the viewing quality of the supplemental object based on whether the supplemental object is viewable to a user.

7. The method of claim 1, wherein a browser application at the user device is configured to invoke a throttle event for a supplemental object associated with the media object based one or more predefined criteria.

8. The method of claim 1, further comprising:
   estimating viewing quality of one or more other supplemental objects associated with the media object, the one or more other supplemental objects being rendered with respect to the media object on the web page,
   wherein the step of estimating the viewing quality of the media object comprises estimating the viewing quality of the media object based on how many of the one or more supplemental objects and the one or more other supplemental objects have a throttle event invoked for the respective supplemental object at a given time.

9. The method of claim 1, wherein a plurality of supplemental objects associated with the media object is rendered with respect to the media object on the web page, the one or more supplemental objects are at least a part of the plurality of supplemental objects, and at least one of the plurality of supplemental objects is rendered at a location on the web page different from a location on the web page at which another one of the plurality of supplemental objects is rendered.

10. A system for assessing viewing quality of a media object, comprising:
   a delivery condition evaluation unit configured to receive information indicating a throttle event with respect to each of one or more supplemental objects associated with a media object, the media object being served at a user device, the one or more supplemental objects being overlaid on or underlaid behind the media object on a web page loaded at the user device, wherein a throttle event throttles a parameter in connection with a supplemental object associated with the media object; and
   a viewing quality evaluation unit configured to:
      estimate viewing quality of the one or more supplemental objects, that are overlaid on or underlaid behind the media object, based on the throttle event with respect to each of the one or more supplemental objects; and estimate viewing quality of the media object based on the viewing quality of the one or more supplemental objects that are overlaid on or underlaid behind the media object.

11. The system of claim 10, wherein the parameter comprises at least one of a frame rate or a compression ratio.

12. The system of claim 10, wherein the media object comprises a video advertisement without the one or more supplemental objects, and the one or more supplemental objects are overlaid on or underlaid behind the video advertisement, and
wherein the step of estimating of estimating the viewing quality of the media object comprises estimating the viewing quality of the video advertisement based on the viewing quality of the one or more supplemental objects that are overlaid on or underlaid behind the video advertisement.

13. The system of claim 10, further comprising:
a billing and/or reporting evaluation unit configured to determine billing information related to delivery of the media object based on the viewing quality of the one or more supplemental objects.

14. The system of claim 10, wherein the media object comprises at least one of a video or animation.

15. The system of claim 10, wherein the viewing quality evaluation unit is configured to estimate the viewing quality of the one or more supplemental objects by processing the received throttle event information to estimate, for each of the one or more supplemental objects, the viewing quality of the supplemental object based on whether the supplemental object is viewable to a user.

16. The system of claim 10, wherein a browser application at the user device is configured to invoke a throttle event for a supplemental object associated with the media object based one or more predefined criteria.

17. The system of claim 10, the viewing quality evaluation unit is configured to estimate viewing quality of one or more other supplemental objects associated with the media object, the one or more other supplemental objects being rendered with respect to the media object on the web page, and
wherein the viewing quality evaluation unit is configured to estimate the viewing quality of the media object by estimating the viewing quality of the media object based on how many of the one or more supplemental objects and the one or more other supplemental objects have a throttle event invoked for the respective supplemental object at a given time.

18. The system of claim 10, wherein a plurality of supplemental objects associated with the media object is rendered with respect to the media object on the web page, the one or more supplemental objects are at least a part of the plurality of supplemental objects, and at least one of the plurality of supplemental objects is rendered at a location on the web page different from a location on the web page at which another one of the plurality of supplemental objects is rendered.

19. A method for assessing viewing quality of a media object, the method being implemented on a machine having at least one processor, storage, and a communication platform, the method comprising:
receiving information indicating a throttle event with respect to each of one or more supplemental objects associated with a video, the video being an object separate from the one or more supplemental objects and served at a user device, the one or more supplemental objects being rendered with respect to the video on a web page loaded at the user device, wherein a throttle event throttles a parameter in connection with a supplemental object associated with the video;
estimating viewing quality of the one or more supplemental objects based on the throttle event with respect to each of the one or more supplemental objects; and
estimating viewing quality of the video based on the viewing quality of the one or more supplemental objects.

20. The method of claim 19, wherein the one or more supplemental objects are overlaid on or underlaid behind the video on the web page,
wherein the parameter comprises at least one of a frame rate or a compression ratio such that a throttle event throttles a frame rate or a compression rate in connection with a supplemental object associated with the video,
wherein the step of estimating the viewing quality of the one or more supplemental objects comprises processing the received throttle event information to estimate, for each of the one or more supplemental objects, the viewing quality of the supplemental object based on whether the supplemental object is viewable to a user,
wherein a browser application at the user device is configured to invoke a throttle event for a supplemental object associated with the video based one or more predefined criteria, and
wherein a plurality of supplemental objects associated with the video is rendered with respect to the video on the web page, the one or more supplemental objects are at least a part of the plurality of supplemental objects, and at least one of the plurality of supplemental objects is rendered at a location on the web page different from a location on the web page at which another one of the plurality of supplemental objects is rendered.

* * * * *